July 24, 1962 W. DANZIGER ETAL 3,045,870
HOT BEVERAGE VENDER
Filed Dec. 2, 1957 6 Sheets-Sheet 1
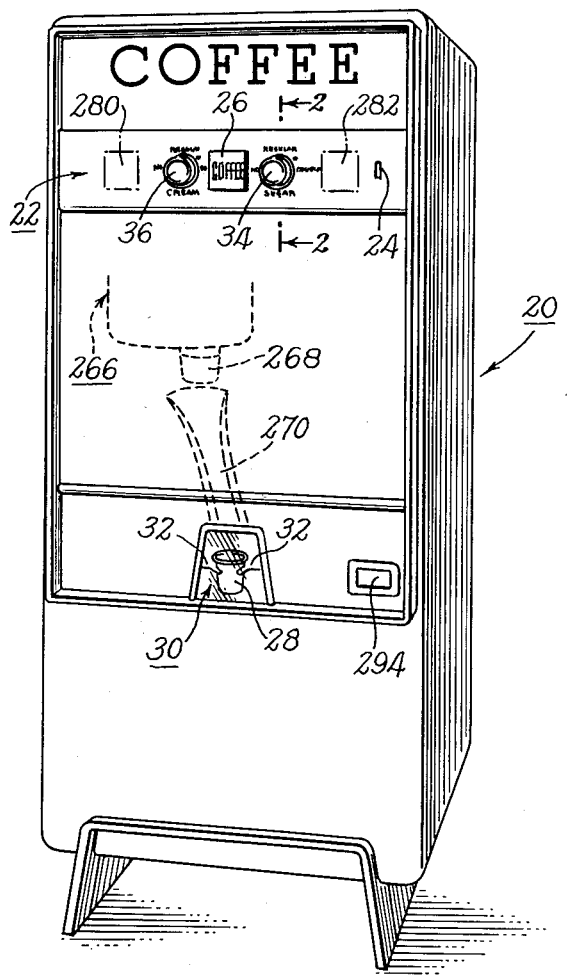
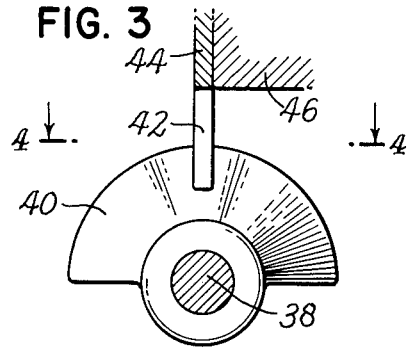
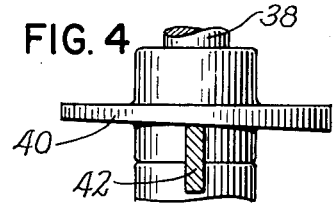
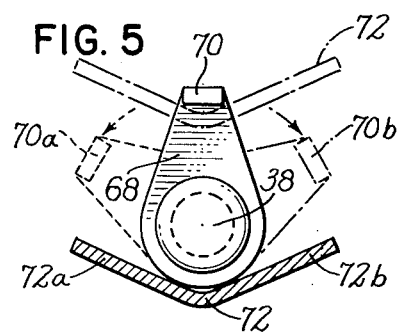
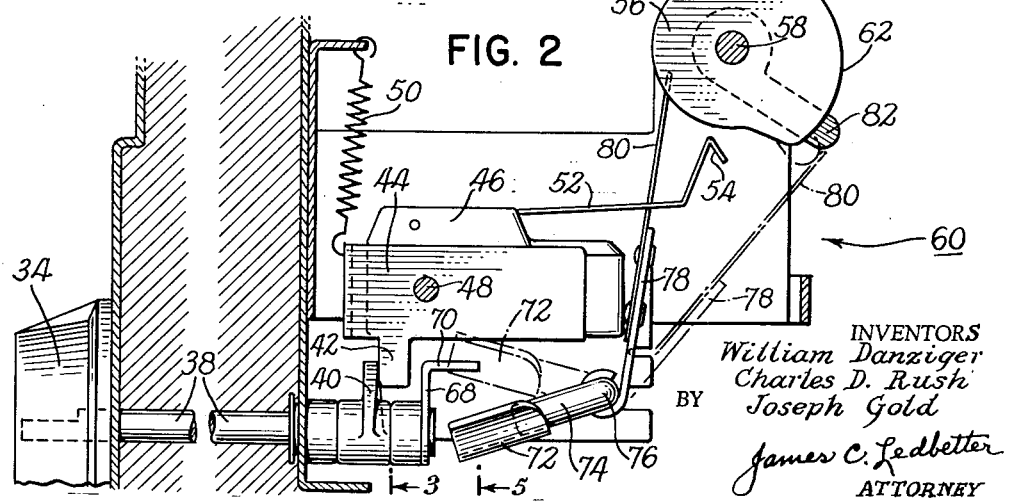
INVENTORS
William Danziger
Charles D. Rush
Joseph Gold
BY
James C. Ledbetter
ATTORNEY July 24, 1962

W. DANZIGER ETAL 3,045,870

HOT BEVERAGE VENDER

Filed Dec. 2, 1957

INVENTORS
William Danziger
Charles D. Rush
BY  Joseph Gold

James C. Ledbetter
ATTORNEY

July 24, 1962 W. DANZIGER ETAL 3,045,870
HOT BEVERAGE VENDER
Filed Dec. 2, 1957 6 Sheets-Sheet 3

INVENTORS
William Danziger
Charles D. Rush
Joseph Gold
BY
James C. Ledbetter
ATTORNEY July 24, 1962
W. DANZIGER ETAL
3,045,870
HOT BEVERAGE VENDER
Filed Dec. 2, 1957
6 Sheets-Sheet 4
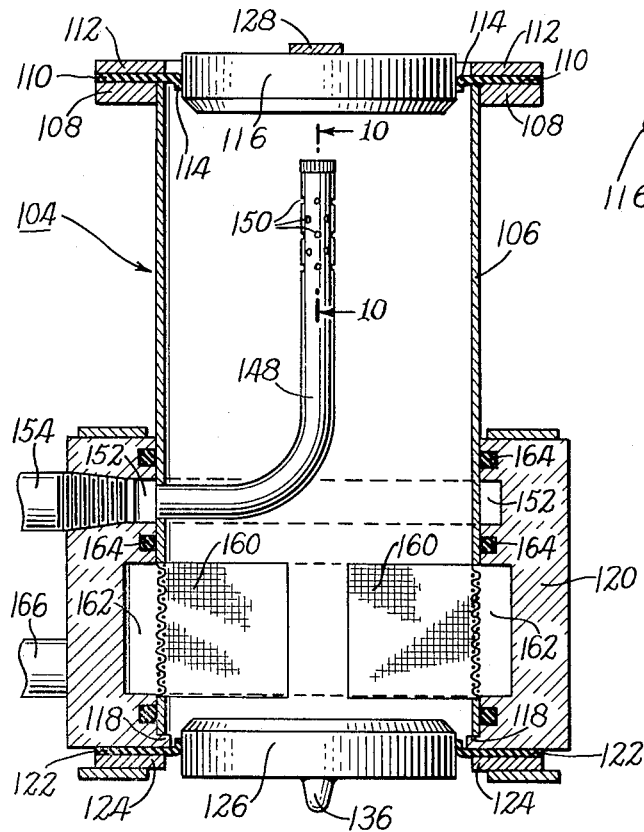
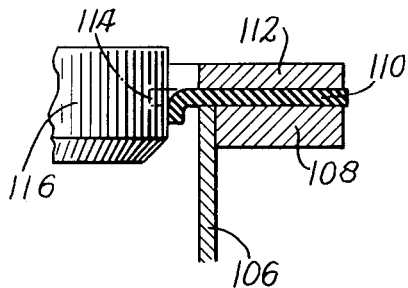
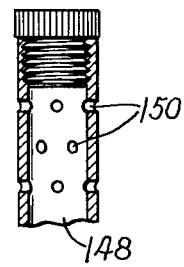
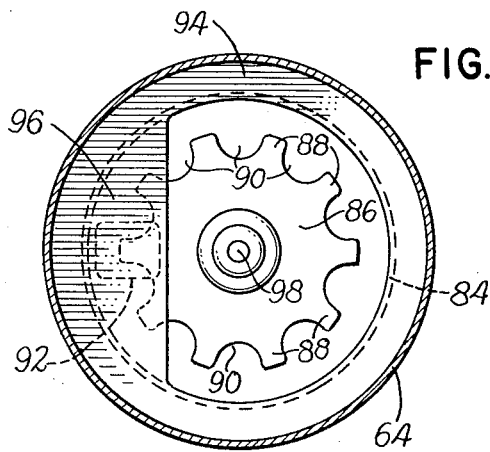
INVENTORS
William Danziger
Charles D. Rush
Joseph Gold
BY
James C. Ledbetter
ATTORNEY

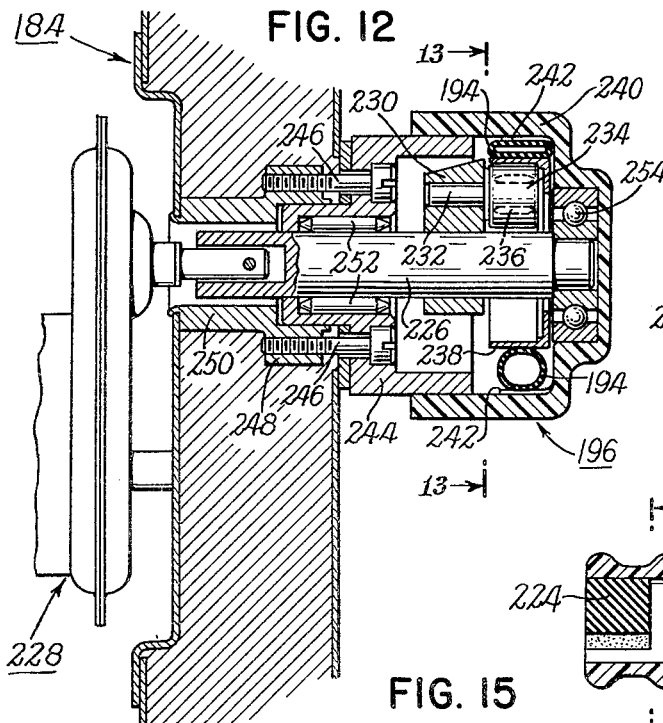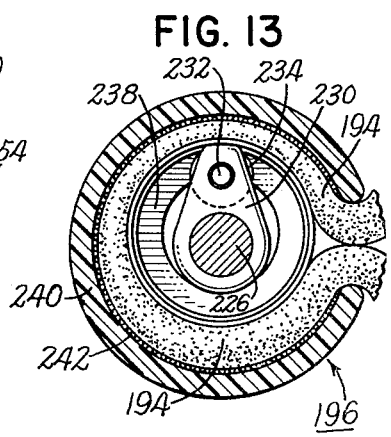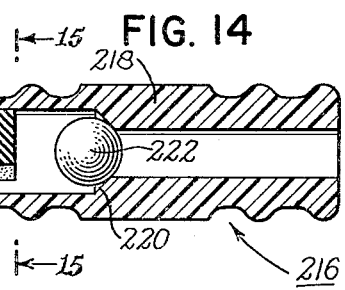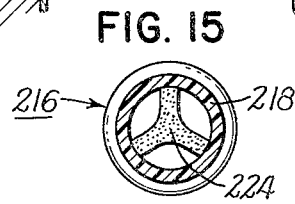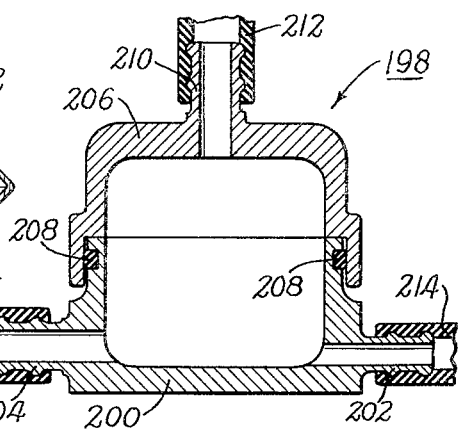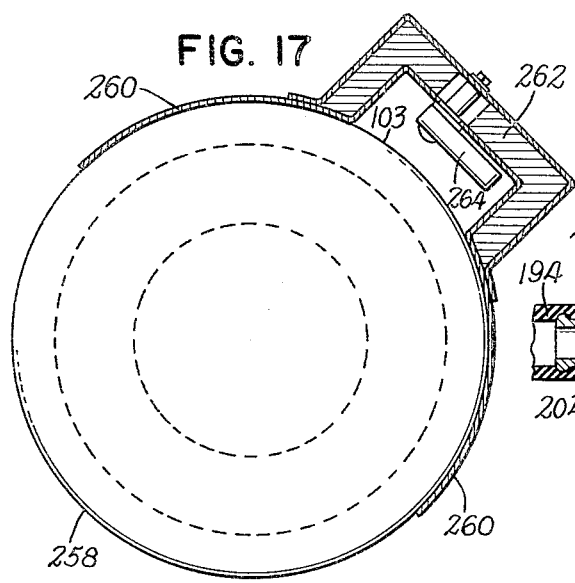

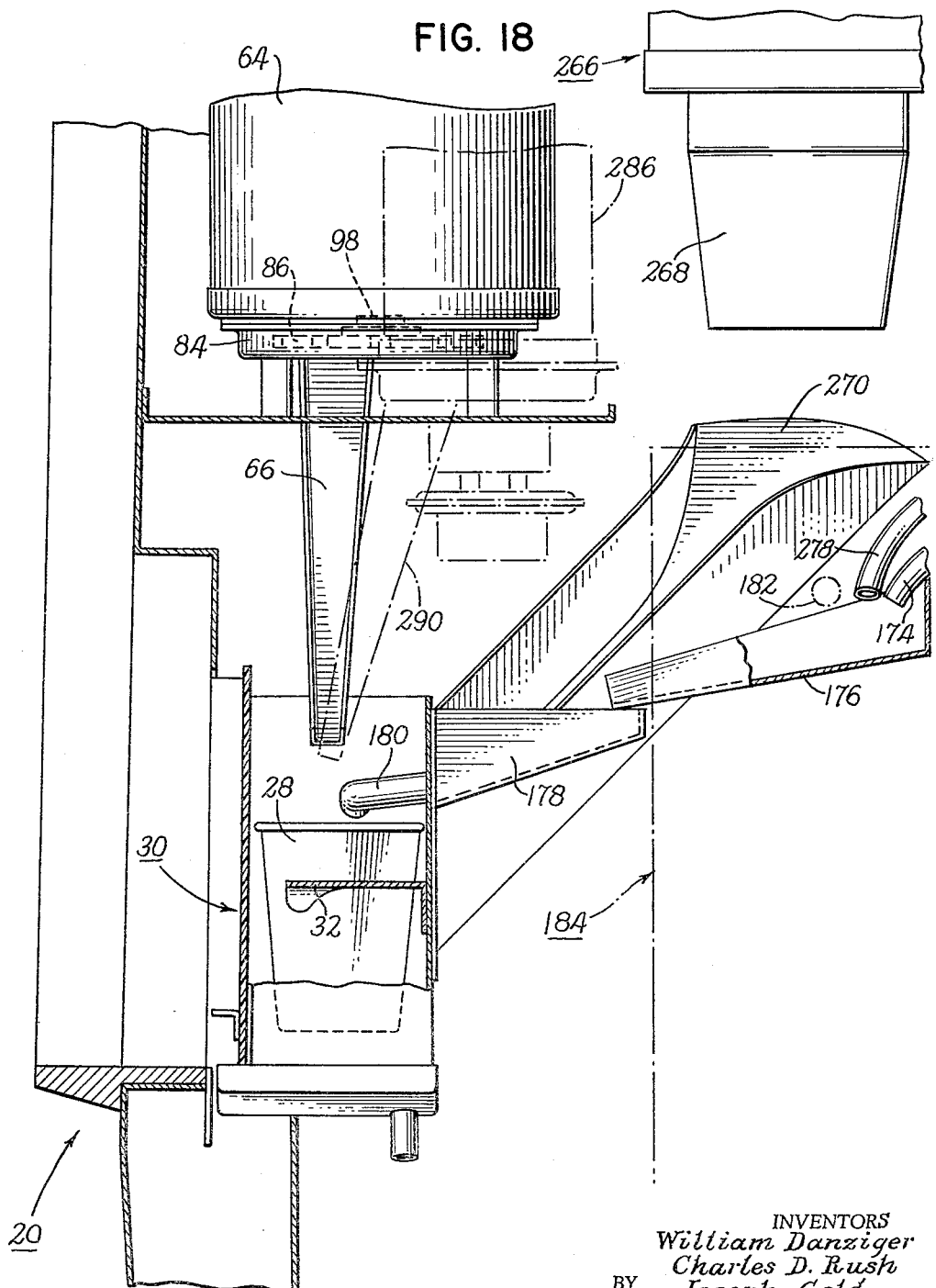

United States Patent Office 3,045,870
Patented July 24, 1962

3,045,870
HOT BEVERAGE VENDER
William Danziger, Franklin Square, Charles D. Rush, Valley Stream, and Joseph Gold, Brooklyn, N.Y., assignors to Continental Vending Machine Corp., Westbury, N.Y., a corporation of New York
Filed Dec. 2, 1957, Ser. No. 700,005
17 Claims. (Cl. 222—70)

This invention relates to beverage dispensing apparatus, and particularly to coin-operated apparatus such as is used for dispensing coffee, entitled Hot Beverage Vender.

The machine disclosed herein as a preferred embodiment of the invention also includes means for dispensing soup or hot chocolate and the like, but these latter means do not by themselves form a part of this invention.

Coffee dispensing machines must, of course, include apparatus for supplying cream and sugar along with the coffee, and desirably this apparatus should be controllable by the customer to permit individual selection of the amounts of such mixing ingredients in accordance with each customer's individual taste. The apparatus provided for this purpose in prior machines, however, has not been entirely satisfactory in several respects. For example, in a number of prior machines the customer can only select one of several preset amounts of cream or sugar, i.e. in fixed increments, with the result that some customers are not able to obtain the precise amount they desire. Furthermore, it sometimes happens that a customer will neglect to adjust the sugar and cream controls prior to the start of the dispensing operation. Since the previous user may have set these controls at an extreme position (such as for "black" coffee), the new customer might receive an entirely unacceptable cup of coffee. In accordance with one aspect of this invention, means are provided to prevent such a result and to solve the foregoing problem.

To assure that there always is fresh coffee available, the dispensing machine should include an automatic brew unit arranged to produce a relatively small amount of coffee at frequent intervals in accordance with the demand. To prevent leakage and faulty operation, the interior of this unit should be tightly sealed from atmosphere during the brewing operation. However, because the brew unit must be cleaned and then recharged with granular coffee between each brewing operation, means must be provided for obtaining access to the interior of the unit, and these means advantageously should be operable in a simple manner by the usual automatic timing mechanism. In accordance with another aspect of the present invention, this problem is solved by a unique closure and sealing arrangement which is economical to manufacture and reliable in operation.

As is well known, the cream to be dispensed with the coffee is subject to spoilage after a period of time in storage and hence it is necessary at frequent intervals to supply the machine with fresh cream. In many prior coffee dispensing machines, the cream is stored in an ordinary dairy container which, after most of the cream has been used up, is replaced by a full container. With such an arrangement, it almost invariably happens that a small quantity of cream remains in the original container. This remainder should, to prevent the growth of harmful bacteria, be thrown away rather than mixed in with the new cream. To avoid such an economic loss, in accordance with a further aspect of the present invention a unique cream supply system is provided which assures that the cream container is completely emptied before replacement.

In connection with pumping the cream out of the supply container and to the coffee cup, it is important for sanitary reasons that the cream not be brought into contact with certain types of materials or mechanical moving parts such as are found in ordinary pumping devices. To meet this requirement, in accordance with a still further aspect of the present invention there is provided a unique pumping arrangement of the type wherein the cream is pressed through a flexible hose by a mechanism located externally of the hose. The particular pumping arrangement disclosed herein is especially adapted for use in a dispensing machine in that it operates with relatively little power and can readily be disassembled to remove the hose from the pumping mechanism for servicing or repair.

Accordingly, it is an object of the present invention to provide a beverage dispensing machine that is superior to such machines provided heretofore. It is another object of this invention to provide such a machine having improved control arrangements for permitting the customer to select the quantity of a mixing ingredient, such as sugar or cream, to be dispensed as part of the beverage. It is a further object of this invention to provide a coffee dispensing machine having a coffee brew unit that is simple in construction and especially adapted for trouble-free operation over a long period of time. It is a still further object of this invention to provide a beverage dispensing machine having improved means to store and supply a mixing ingredient, particularly cream. Other objects and advantages of the invention will in part be pointed out in, and in part apparent from, the following description considered together with the accompanying drawings, in which:

FIGURE 1 is a perspective view of a coffee dispensing machine including apparatus constructed in accordance with the present invention;

FIGURE 2 is a vertical section taken along line 2—2 of FIGURE 1, showing details of the control mechanism for adjusting the amount of sugar to be dispensed with the coffee;

FIGURE 3 is a sectional view taken along line 3—3 of FIGURE 2;

FIGURE 4 is a sectional view taken along line 4—4 of FIGURE 3;

FIGURE 5 is a sectional view taken along line 5—5 of FIGURE 2, showing details of the resetting mechanism for returning the sugar control knob to its normal position after a dispensing operation has been completed;

FIGURE 8 is a cross-section view taken along line 8—8 of FIGURE 7, showing the interior of the coffee brew unit;

FIGURE 9 is an enlarged view of the closure seal for the coffee brew unit;

FIGURE 10 is a detail section taken along line 10—10 of FIGURE 8, showing the upper end of the hot water spray pipe;

FIGURE 11 is a horizontal section taken along line 11—11 of FIGURE 6, showing the rotatable slotted disc for feeding sugar into the cup;

FIGURE 12 is a longitudinal section of the pump used to supply cream to the beverage dispensing station;

FIGURE 13 is a cross-section of the cream pump taken along line 13—13 of FIGURE 12;

FIGURE 14 is a longitudinal section of the check valve used in the cream feed line;

FIGURE 15 is a cross-section taken along line 15—15 of FIGURE 14 to show the retaining spider for the check valve ball;

FIGURE 16 is a cross-section of the accumulator forming part of the cream feed line;

FIGURE 17 is a horizontal section taken along line 17—17 of FIGURE 7, showing particularly the thermostatic sensing element for maintaining the coffee in the storage tank at a constant temperature; and FIGURE 18 is a vertical section taken along line 18—18 of FIGURE 6 showing the arrangement of parts with the cabinet door closed.

Figure 6:
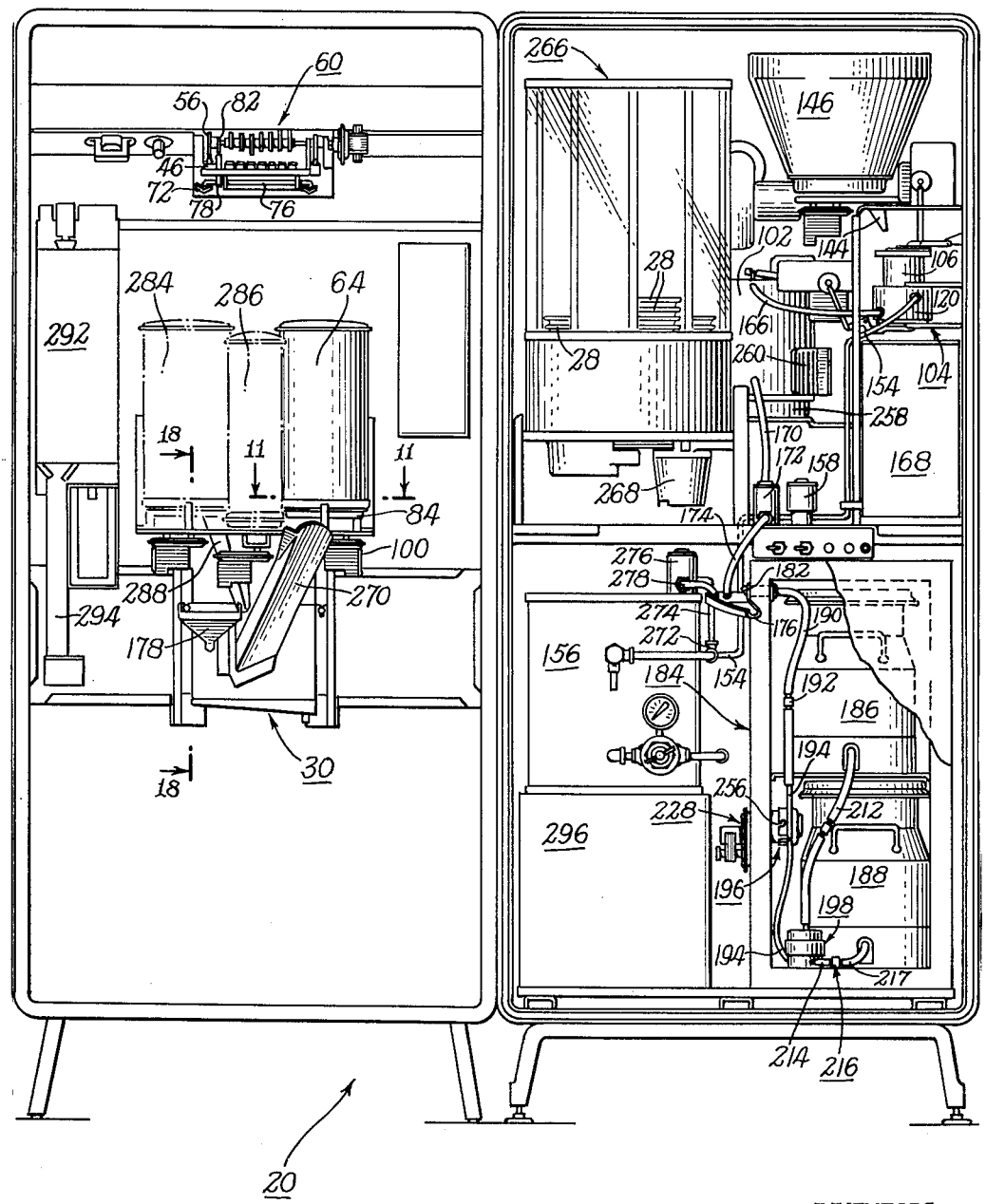
FIGURE 6 is an elevation view showing the interior of the dispensing machine of FIGURE 1 with its front door in open position.

Referring now to FIGURE 1, the dispensing equipment is contained in a cabinet 20 the front panel of which consists of a door hinged at its left-hand side to permit access to the interior of the cabinet for servicing or repair. This front panel is provided near the top thereof with operating controls, generally indicated at 22, for initiating a dispensing operation after the required number of coins has been inserted into a coin slot 24 near the right-hand side of the panel. These operating controls include a centrally-located coffee button 26 which when depressed starts a cycle of operations for dispensing a cup of coffee. At the beginning of this cycle, a beverage receptacle in the form of a paper cup 28 is automatically dropped into a dispensing station 30 recessed in the front panel, and this cup is held in place by a pair of opposed spring grips 32 while being filled with coffee and the selected amounts of cream and sugar.

To the right of the coffee button 26 there is a sugar control knob 34 for presetting the amount of sugar to be deposited in the cup 28 along with the coffee. This knob normally is set in an intermediate position (labelled "regular") wherein an average portion of sugar is dispensed. The knob, however, is rotatable between two extreme positions (labelled "none" and "double") to permit the customer to select any desired amount from zero up to twice the average portion. To the left of the coffee button is a corresponding cream control knob 36 also normally in "regular" position and continuously adjustable between "none" and "double" positions. The control mechanisms actuated by the sugar and cream control knobs are essentially identical, and for that reason only one of these mechanisms is shown and described in detail hereinbelow.

Referring now to FIGURES 2 through 5, the sugar control knob 34 is secured to a control shaft 38 which extends through the front panel of the cabinet and carries a linear face-cam 40 arranged to rotate with the control knob. Pressed against the face of this cam is a control arm 42 forming part of a mounting plate 44 to which is secured a flow control switch 46 (e.g. of the type known as a microswitch). This plate and the switch are pivoted about a pin 48 secured to the cabinet frame by means not shown, and the plate is urged in a clockwise direction about this pin by a spring 50 the upper end of which also is secured to the cabinet frame. By these means, the control arm 42 is firmly pressed against the face of the cam 40 so that, as this cam is rotated by the control knob 34, the switch 46 is correspondingly rotated throughout a range of positions about its pivot pin 48.

The switch 46 is provided with a spring sensing arm 52 the end 54 of which is in contact with the periphery of a linear spiral cam 56 (shown in its initial position prior to the start of a dispensing operation). During the dispensing cycle, this spiral cam is rotated one full revolution counterclockwise by a cam shaft 58 driven at constant speed by the usual motor forming part of a dispensing timer generally indicated at 60 in FIGURE 6. During a normal dispensing cycle, one point of the lobe 62 of the cam 56 will depress the sensing arm 52 sufficiently to actuate the switch 46. Actuation of this switch in turn energizes a mechanism (to be described) which causes sugar to flow from a sugar storage bin 64 (see FIGURE 18) through an outlet nozzle 66 and into the cup 28. At the end of the dispensing cycle, the cam lobe moves out of contact with the sensing arm, and this arm thereupon moves upwards to deactuate the switch 46 and stop the flow of sugar into the cup.

By turning the sugar control knob 34 counterclockwise to the extreme setting labelled "none," the switch 46 will be rotated clockwise (referring to FIGURE 2) away from the spiral cam 56 to such an extent that the cam lobe 62 will not actuate the switch during a dispensing cycle. Consequently, in this condition no sugar will flow into the cup. Alternatively, if the control knob is turned clockwise to its "double" setting, the switch 46 will be rotated sufficiently close to the spiral cam that the switch will be actuated substantially at the same time that the cam lobe 62 strikes the sensing arm 52. As a result, sugar will flow into the cup for a period of time sufficient to provide a portion of sugar that is twice the average amount. The precise amount of sugar dispensed can, of course, be varied continuously between these two extremes by adjusting the setting of the control knob 34.

Since a customer might neglect to set the sugar control knob 34, resetting means are provided for assuring that this control knob normally is set at its "regular" position before a dispensing operation begins. For this purpose, the control shaft 38 carries on its inner end a finger member 68 including a horizontal tab 70. This tab is engageable by a V-shaped scoop 72 consisting of a pair of angularly-disposed wings 72a and 72b. This scoop is secured to the offset end 74 of a rotatably mounted horizontal rod 76 to which is fastened an upwardly-extending crank arm 78 carrying a spring strip 80. The upper tip of this strip is engaged at the end of a dispensing cycle by a dog 82 secured to the cam shaft 58, and this dog rotates the crank arm 78 and the rod 76 clockwise to shift the scoop 72 upwardly towards the tab 70.

If, at the start of a dispensing cycle, the sugar control knob 34 had been set at a position other than "regular," e.g. as indicated by the positioning of the tab 70 as shown in dotted outline at 70a or 70b in FIGURE 5, one of the scoop wings 72a or 72b will contact the tab and carry it upwards so as to rotate it about the shaft 38 towards its center ("regular") position. Thus, the control knob 34 and the face-cam 40 will be returned to their corresponding intermediate positions. Accordingly, if a subsequent customer does not adjust the setting of the sugar control knob, he will receive a cup of coffee having an average amount of sugar.

As mentioned above, an identical mechanism is used in conjunction with the cream control knob 36 to assure that the customer normally will receive an average amount of cream. This mechanism is located immediately behind the cream control knob, and includes a resetting scoop (not shown) which is carried by the remote end of the rod 76 shown in FIGURE 2.

Referring now to FIGURES 6, 11 and 18, the sugar storage bin 64 is provided at its lower end with a pan 84 in which is concentrically mounted a slotted disc 86 having around its periphery a number of fingers 88 separated by semi-circular slots 90. The bottom of the pan is formed with a rectangular outlet aperture 92 over the outlet nozzle 66 leading to the dispensing station 30. Immediately above the disc 86 is a ring plate 94 having a sector-shaped shield portion 96 located over the aperture 92 to serve as a shield for preventing sugar from passing directly from the interior of the bin to the outlet nozzle.

The hub 98 of the disc 86 is coupled to a drive motor 100 below the sugar storage bin 64. During a coffee-dispensing operation, this motor is energized (by actuation of the flow control switch 46 previously referred to) to rotate the disc 86 for a period of time determined by the setting of the sugar control knob 34. As long as the disc rotates, it carries sugar from the bin 64 to beneath the sector shield 96 and drops it down the outlet nozzle 66. Thus, the disc 86 and the switch 46, together with the dispensing timer 60, serve as flow control means to control the amount of sugar dispensed with the coffee.

Because certain common beverage ingredients, such as sugar, are hygroscopic in nature (i.e. they tend to absorb moisture readily), there has existed a problem in controlling the flow of such ingredients out of a supply bin and to a beverage receptacle. That is, moist sugar for example tends to clog up a feeding mechanism, and to "bridge over" an outlet aperture so as to prevent smooth and controllable flow. Furthermore, in a feeding mechanism wherein there are relatively close spacings between sliding parts and the like, the sugar particles tend to stick on these parts and produce a grinding action which considerably increases the driving power requirements.

It has been found that this problem is solved by arranging the slotted disc 86 with a substantial clearance between the ends of the fingers 88 and the side wall of the pan 84. Advantageously this clearance is approximately equal to the radial depth of the slots 90. With such an arrangement, rotation of the disc 86 will cause the sugar (or any other relatively hygroscopic ingredient) to flow smoothly from the sugar storage bin 64 and down the outlet nozzle 66 to the cup 28. The flow, furthermore, is at a nearly constant rate (i.e. the sugar does not flow in discrete increments as in the usual slotted or apertured disc construction), and hence the quantity of sugar dispensed may be controlled quite precisely by controlling the time interval during which the disc rotates. As mentioned above, this time interval is set by the positioning of the sugar control knob 34.

Referring now to the upper right-hand portion of FIGURE 6, the fresh liquid coffee to be dispensed is stored in a coffee storage tank 102 having a capacity of 24 cups. When the coffee in this tank drops to a level where only 12 cups remain, an automatic brewing cycle is initiated by the usual means, not shown, to brew an additional 12 cups of fresh coffee and to transfer this coffee to the storage tank. This coffee is produced in a coffee brew unit 104 now to be described.

Referring now to FIGURES 7 through 10, the brew unit 104 comprises a tank in the form of a cylindrical tube 106 having an external flange 108 secured to its upper end. Seated on this flange is a flexible rubber washer 110 held in place by a clamp ring 112 screwed to the flange. The inner diameter of the washer is smaller than the tube diameter so that the washer forms a resilient lip 114 extending inwardly around the entire periphery of the open end of the tube, as indicated in dashed outline in FIGURE 9.

Movable into and out of the open end of this tube 106 is a top closure plate 116 which is circular and has a diameter larger than the aperture formed by the washer. Thus, when the closure plate is moved downwardly into the tube end as shown in FIGURE 8, it deforms the washer lip 114 towards the interior of the tube to provide a pressure-resistant, liquid-tight seal. A special advantage of this arrangement is that it does not require close mechanical tolerances; that is, normal variations in lateral or vertical positioning of the closure plate do not have any important effect on the quality of the seal.

The lower end of the tube 106 rests on an interior shoulder 118 forming part of a cylindrical base member 120, so that the tube is readily removable from this base member for cleaning or repair. A second rubber washer 122 is secured to the bottom of the base 120 by means of another clamping ring 124, and this latter washer serves to form a liquid-tight seal (as described above with reference to the first washer 110) with a bottom closure plate 126.

The top closure plate 116 is moved relative to the tube 106 by a pivoted arm 128 (FIGURE 7) which is actuated by a link 130 pinned eccentrically to a disc 132. This disc is rotated by a shaft 134 the drive motor for which is controlled by the usual brew-cycle timer (not shown). The bottom closure plate 126 is operated by a bell crank 136 which is actuated by another link 138 pinned eccentrically to a second disc 140. This latter disc is rotated by a shaft 142 the drive motor for which also is controlled by the brew-cycle timer.

At the start of a brewing cycle, the top of the brew unit 104 is opened and a fixed quantity (ordinarily one-quarter pound) of granular coffee is dropped into the tube 106 by a coffee chute 144 extending down from a coffee hopper 146. (For this purpose, the coffee hopper is provided with a slotted disc 147 which operates like the slotted disc 86 previously described in connection with the sugar storage bin 64.) The top closure plate 116 then is moved down into seal position and (referring again to FIGURE 8) hot water is fed into the interior of the brew unit through a curved spray pipe 148 which is formed at its upper end with perforations 150 to direct the hot water onto all portions of the granular coffee charge.

The lower end of this spray pipe 148 is integrally secured to the wall of the tube 106, and communicates through an aperture in this wall with an annular water inlet groove 152 formed in the base 120. This groove in turn is connected by a pipe 154 (see also FIGURE 6) to a hot water supply tank 156 which maintains a supply of water at a temperature of about 200° F. and a pressure of about 15 p.s.i. A valve 158 in this latter pipe is controlled by the brew-cycle timer so as to cause hot water to flow into the brew unit 104 for a predetermined time (normally about 2 minutes) at a rate sufficient to provide 12 cups of coffee during this period.

While the hot water is entering the brew unit 104, the pressure in the tube 106 (normally about 5 p.s.i.) is sufficient to produce a substantial force tending to move the closure plates 116 and 126 away from the tube. However, the closure plates are positively held in place by the links 130 and 138 which are aligned with the axes of the corresponding shafts 134 and 142 so as to provide the required reactive force without any need for energizing the motors which drive these shafts. The only flexible region exposed to the internal tube pressure is the small area represented by the washer lip 114, and the seal produced by the deformation of this lip is well adapted to prevent leakage.

The liquid coffee produced by the incoming hot water is forced out of the brew unit 104 through screened apertubes 160 formed in the wall of the tube 106. These apertures communicate with an annular coffee outlet groove 162 formed in the base 120 immediately beneath the inlet groove 152, the two grooves being sealed by three O-rings 164 which press against the side wall of the tube. The coffee is fed from the outlet groove to the coffee storage tank 102 by means of a coffee hose 166.

With these annular grooves 152 and 162, it is unnecessary to precisely position the tube 106 relative to the base 120. Thus, the tube and spray pipe 148 may be removed for cleaning and then replaced in a short time without difficulty.

After the required amount of coffee has been brewed and passed to the storage tank 102, the bottom closure plate 126 is moved downwards and away (as shown in dashed outline in FIGURE 7) to permit the used coffee grounds to drop into a waste container 168 immediately beneath. At the same time, the brew-cycle timer actuates another valve (not shown) in the hot water pipe 154 leading to the brew unit spray pipe 148 so as to direct a heavy stream of hot water into the tube for several seconds and thus flush out any remaining coffee particles. Subsequently, the bottom closure plate is returned to its seal position and the brew unit 104 is ready for another brewing operation when required.

Reverting now to FIGURE 6, during a coffee dispensing cycle the brewed coffee is fed from the storage tank 102 through a hose 170 and to a metering valve 172 which is controlled (through the usual means, not shown) by the dispensing timer 60 to fix the amount of coffee deposited in the cup 28. From this valve, the coffee passes through a coffee outlet hose 174, the end of which feeds the coffee into a trough 176 leading to a guide tray 178 secured to the door of the cabinet 20 adjacent the dispensing station 30 (see also FIGURE 18). The bottom of this tray slopes downwardly towards the dispensing station, and a nozzle 180 communicates with this tray and serves to direct the coffee into the cup 28.

Immediately alongside the coffee outlet hose 174 is a cream outlet 182 through which cream is supplied to the trough 178 from a refrigerator box 184 in which is mounted a pair of cream containers 186 and 188 one above the other. This cream outlet 182 is at the end of a cream hose 190 which passes through the thermally-insulated wall of the refrigerator box and through an output check valve 192 to a smaller hose 194 formed of soft flexible latex. This flexible hose passes through a cream pump 196 (to be described) and leads to an "accumulator" 198 which serves as a common supply chamber connected to both of the cream containers.

Referring now to FIGURE 16, the accumulator 198 includes a main body 200, having inlet and outlet fittings 202 and 204, and a top casing 206 telescoped over the body with an O-ring seal 208. The casing also carries an inlet fitting 210 to which is connected a conduit means in the form of a hose 212 leading to the bottom of the upper cream container 186. The inlet fitting 202 is connected to the bottom of the lower cream container 188 by another conduit means consisting of a hose 214, an inlet check valve 216 (FIGURES 6, 14 and 15) and a second hose 217. This check valve includes a tubular member 218 having a reduced-diameter portion provided with an end seat 220 for a ball 222. When cream is flowing out of the lower container, the ball is held by a rubber retaining spider 224 jammed in position in the tubular member.

As long as there is cream in the upper container 186, the pressure in the hose 212 leading to that container will be greater than the pressure in the hose 217 leading to the lower container 188, and the inlet check valve 216 prevents any flow of cream from the upper container into the lower container. Consequently, any cream dispensed by the pump 196 will be supplied by the upper container. As a result, the upper cream container will be completely emptied before cream is drawn out of the lower container. This action is especially supplemented by the accumulator 198 which, by virtue of the fact that its capacity (about 3 fluid ounces) is large relative to the amount of cream pumped during a dispensing cycle (one fluid ounce maximum) assures that the pressure in the inlet fitting 202 does not momentarily drop below the pressure in the hose 217 during the short periods of time when the cream pump 196 is operating.

When the upper container 186 has been emptied, and the level of the cream in the hose 212 drops below that of the level of the cream in the lower container 188, the pressure in the hose 217 will become greater than the pressure in hose 212 and hence cream can flow from the lower container into the accumulator 198. Since the check valve 216 somewhat impedes the flow of cream out of the lower container, the accumulator serves an additional function in providing a supply of cream which can readily be drawn off by the pump 196, and thus the accumulator effectively insulates the pump from the restrictive effects of the check valve. The cream pump is operated for no more than four seconds at the beginning of each dispensing cycle and, during the relatively long period (i.e. at least about 10 to 15 seconds) that the cream pump is inactive for the remainder of the cycle, the accumulator will be refilled from the lower container.

After most of the cream has been dispensed from the lower container 188, the upper container 186 normally will be replaced by the lower container and a new full container of cream placed in the lower position. Therefore, there is no loss of cream, and there is no danger that old cream will remain in the machine for a long period of time.

Referring now to FIGURES 12 and 13, the cream pump 196 includes a central shaft 226 which extends through the insulated wall of the refrigerator box 184 and is driven by a gearbox and motor 228 mounted on the outside of the box. This shaft carries an offset arm 230 in which is pressed a small rod 232 carrying an eccentric pressure member in the form of a roller 234 supported by needle bearings 236. Positioned about this roller is a rigid metal cup 238 having a relatively large central aperture through which the shaft 226 extends. The side wall of this cup is engaged by the roller 234 as it revolves around the shaft, and the loose mounting provided by the large aperture of the cup permits the cup to shift laterally with respect to the shaft as the roller revolves. The flexible hose 194 extending up from the accumulator 198 is wrapped around this cup in the form of a loop, and a rigid ring, in the form of a plastic casing 240 provided with internal spline-grooves 242, is telescoped in place around this loop.

While the roller 234 travels in a circular path about the axis of the shaft 226, it applies pressure eccentrically to the cup 238 which in turn pinches the flexible hose 194 against the casing 240. This rotary pinching action, which does not completely close the hose, forces the cream in the hose through the cream outlet 182 (FIGURE 6) to the trough 176, and at the same time draws cream up from the accumulator 198 into the lower end of the flexible hose. The spline-grooves 242 in the wall of the casing 240 grip the hose lightly to prevent it from feeding through the pump.

The output check valve 192 in the hose 190 leading to the cream outlet serves to maintain this latter hose full of cream so that the amount of cream dispensed is independent of the level in the containers 186 or 188, and additionally serves to assure that the cream pump is always primed. This check valve 192 is constructed identically to the inlet check valve 216 previously described.

The pump 196 includes a tubular frame member 244 which is secured by bolts 246 to a flange 248 forming part of a support ring 250 fastened to the wall of the refrigerator box 184. The pump shaft 226 is provided with roller bearings 252 adjacent its left-hand end and with ball bearings 254 at its right-hand end to assure smooth and free rotation. The ball bearings are held in place by the plastic casing 240 which is fastened to the frame member 244 by a bayonet-type clip 256 (FIGURE 6) for ready removal and disassembly of the pump for cleaning or repair.

The pump motor 228 is energized by the dispensing timer 60, during the first part of a dispensing cycle, for a period of time that is determined by the setting of the cream control knob 36 (FIG. 1) on the front panel of the cabinet 20, i.e. as by means of a control mechanism identical to that shown in FIGURE 2. Thus, a preselected discrete quantity (typically in the range of zero to one fluid ounce) of cream is dispensed. During the remaining part of the dispensing cycle, the coffee is poured into the trough 176 and thereby serves also to flush any remaining cream down into the cup 28.

Figure 7:
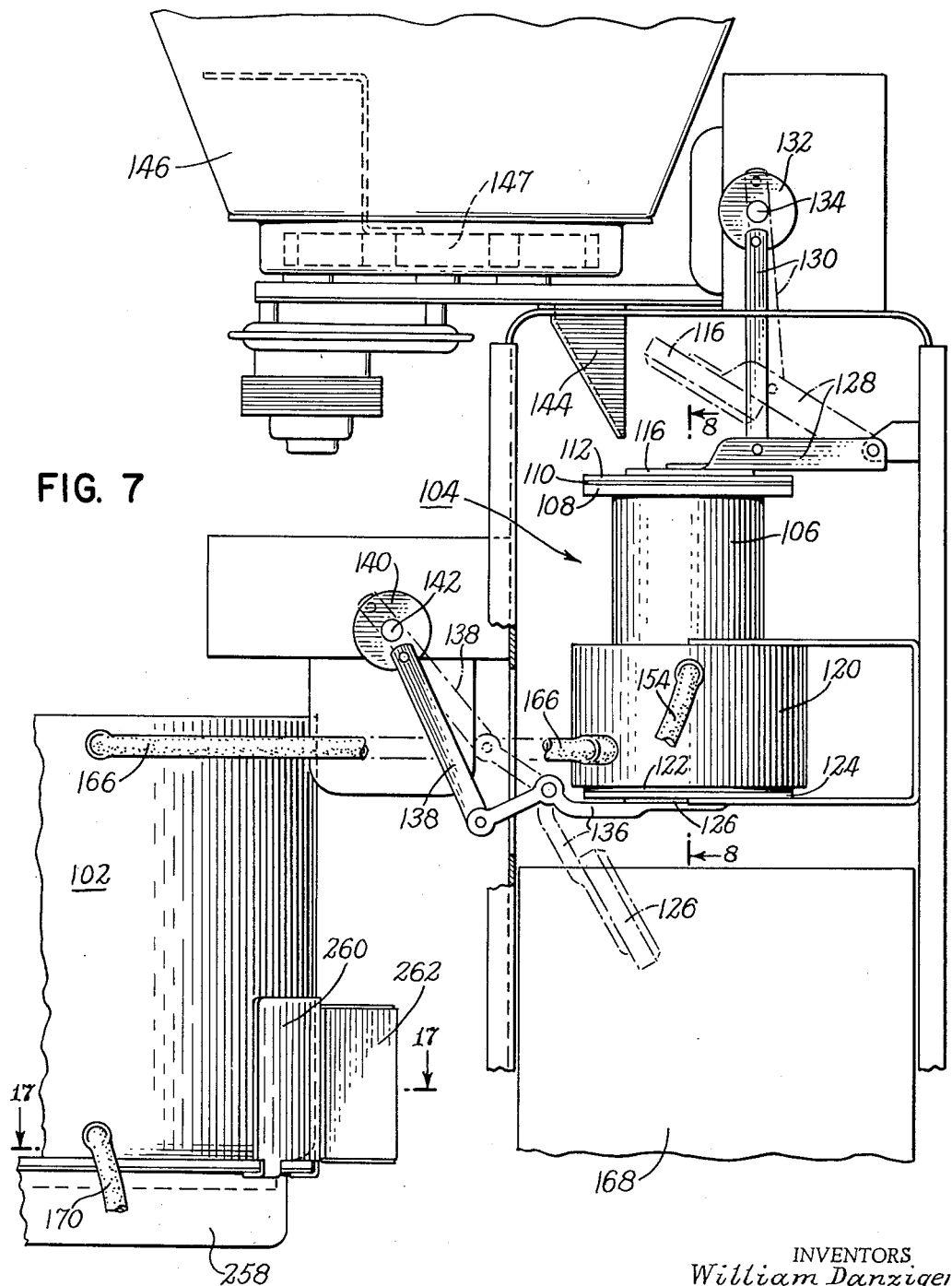
FIGURE 7 is a detail view showing, in enlarged scale, the elements of the coffee brewing equipment shown in the upper right-hand corner of FIGURE 6.

Referring now to FIGURES 6, 7 and 17, the coffee sotrage tank 102 is mounted on a pedestal 258 which is permanently secured to the cabinet 20. Thus, the tank may readily be removed from the cabinet for cleaning and servicing. The coffee in the tank is heated by a conventional electrical heating unit (not shown) in the pedestal. The rear and right-hand side (referring to FIGURE 7) of the tank 102 abut a semi-cylindrical support wall 260 which conforms to the contours of the tank and is fixedly secured to the pedestal.

The temperature of the coffee in the tank 102 is maintained constant by thermostatic control of the electrical current supplied to the heating unit in the pedestal 258. For this purpose, there is secured to the support wall 260 a U-shaped thermal insulation shield 262 carrying an adjustable temperature-sensitive bi-metallic element 264 of usual construction. This element is connected in the electrical circuit which energizes the pedestal heating unit, and operates to turn this unit off and on in response to changes in the coffee temperature as represented by the heat radiated or conducted to the element 264 from the exposed side 103 of the storage tank 102. It has been found that this temperature control arrangement very effectively maintains the coffee temperature constant, and is particularly advantageous in that it permits the coffee storage tank 102 to be removed, when required, without the need for disconnecting the wires leading to the heating unit or the bi-metallic element 264.

Returning again to FIGURE 6, a supply of paper cups is stacked in a cup magazine 266 to be fed out one at a time from the bottom of this magazine through a cup outlet 268. From this outlet, the cups slide down a chute 270 (which is secured to the door of the cabinet 20) and drop into place between the spring grips 32 at the dispensing station 30.

In connection with the dispensing of other beverages, such as soup and hot chocolate, the hot water pipe 154 leading from the hot water supply tank 156 is provided with a T-fitting 272 to which a second pipe 274 is connected. This latter pipe carries hot water through a valve 276 to a hose 278 which directs the hot water to the trough 176 and guide tray 178 leading to the dispensing station 30. The valve 276 is operated by the dispensing timer 60 when the soup or hot chocolate control buttons 280 and 282 (FIGURE 1) are depressed by the customer, and dispenses the required amount of hot water for these beverages. As shown in FIGURE 6, there is secured to the door of the cabinet 20 a pair of storage bins 284 and 286 which contain supplies of the powder mix for these beverages. Referring also to FIGURE 18, these bins are provided with outlet nozzles 288 and 290 which direct the predetermined quantity of mix into the cup 28.

Also on the cabinet door (FIGURE 6), there is provided the usual coin mechanism 292 which counts the coins dropped in the slot 24 (FIGURE 1), operates a master relay (not shown) for starting the dispensing timer 60 when sufficient money has been deposited, and rejects bent or otherwise unacceptable coins and returns them through a coin-return chute 294. Beneath the hot water supply tank 156 is the compressor 296 for the refrigerator box 184.

Although a preferred embodiment of the invention has been set forth in detail, it is desired to emphasize that this is not intended to be exhaustive or necessarily limitative; on the contrary, the showing herein is for the purpose of illustratiing the invention and thus to enable others skilled in the art to adapt the invention in such ways as meet the requirements of particular applications, it being understood that various modifications may be made without departing from the scope of the invention as limited by the prior art.

What is claimed is:

1. In a beverage dispensing machine wherein a receptacle is automatically filled with a quantity of beverage including an amount of a mixing ingredient, apparatus for feeding a preset amount of said ingredient into said receptacle comprising, in combination, storage means for holding a supply of said ingredient, outlet means for carrying said ingredient from said storage means to the beverage receptacle, flow control means for said outlet means and arranged when activated to cause a discrete amount of said ingredient to flow into said receptacle, said flow control means including a manually-operable control shaft rotatable throughout a range of positions and arranged to set the amount of said ingredient in accordance with its position, an offset finger member secured to said shaft to rotate therewith, and a resetting mechanism including a V-shaped scoop engageable with said finger member and movable to rotate said finger member and said control shaft back to a predetermined normal position after the preset amount of ingredient has been deposited in the receptacle.

2. In a beverage dispensing machine including a cabinet with means to hold a receptacle to be automatically filled with a quantity of beverage including an amount of a mixing ingredient, apparatus for feeding a preset amount of said ingredient into said receptacle comprising, in combination, storage means for holding a supply of said ingredient, outlet means for carrying said ingredient from said storage means to the beverage receptacle, flow control means for said outlet means and arranged when activated to cause said ingredient to pass through said outlet means to said receptacle, a rotatably mounted switch forming part of said flow control means and arranged when operated to stop the passage of said ingredient through said outlet means, a sensing arm for said switch, a cam engaged with said sensing arm for actuating said switch a predetermined time interval after the activation of said flow control means, drive means for rotating said cam at a constant speed during a dispensing operation, a control arm movable through a range of positions and operative to rotate said switch and said sensing arm and thereby alter the pressure applied by said cam to said sensing arm, whereby said time interval is determined by the positioning of said control arm, and a control knob operable externally of said cabinet and connected to said control arm to set the positioning thereof prior to the start of a dispensing operation.

3. In a beverage dispensing machine wherein a receptacle is automatically filled with a quantity of beverage including an amount of a mixing ingredient, apparatus for feeding a preset amount of said ingredient into said receptacle comprising, in combination, storage means for holding a supply of said ingredient, outlet means for carrying said ingredient from said storage means to the beverage receptacle, flow control means for said outlet means and arranged when activated to cause a discrete amount of said ingredient to flow into said receptacle, said flow control means including a manually-operable control shaft rotatable throughout a range of positions and arranged to set the amount of said ingredient in accordance with its position, an offset tab member carried by said shaft and extending out beyond the end thereof, a V-shaped scoop having a pair of wings engageable with said tab, and means operable at the end of a dispensing operation for shifting said scoop in a direction transverse to the axis of said control shaft, whereby said tab is driven toward the center of said scoop so as to rotate said tab and said control shaft back to a predetermined normal position.

4. In a beverage dispensing machine wherein a receptacle at a dispensing station is automatically filled with beverage, apparatus for storing and supplying a liquid ingredient of the beverage comprising, in combination, first and second containers each adapted to hold a quantity of said ingredient, a common supply chamber, first and second conduits connecting said first and second containers respectively with said chamber to feed said ingredient thereto, means for conveying said ingredient from said chamber to said dispensing station, and means responsive to the presence of said ingredient in said first container, said last-named means being automatically operable to pressurize the ingredient in said first conduit to a greater extent than the ingredient in said second conduit as long as there is a supply of said ingredient in said first container, whereby said first container is emptied prior to said second container.

5. In a beverage dispensing machine wherein a receptacle at a dispensing station is automatically filled with beverage, apparatus for storing and supplying an ingredient of the beverage comprising, in combination, first and second containers each adapted to hold a quantity of said ingredient, a common supply chamber to be supplied with said ingredient from both of said containers, first and second conduits connecting said first and second containers respectively with said chamber to feed said ingredient thereto, pump means for conveying said ingredient from said chamber to said dispensing station, means for pressurizing the ingredient in said first conduit to a greater extent than the ingredient in said second conduit, as long as there is a supply of said ingredient in said first container, whereby said first container is emptied prior to said second container, and a check valve in said second conduit for preventing flow of said ingredient from said first container to said second container.

6. In a beverage dispensing machine wherein a receptacle at a dispensing station is automatically filled with beverage, apparatus for storing and supplying a liquid ingredient of the beverage comprising, in combination, first and second containers each adapted to hold a quantity of said ingredient, a common supply chamber positioned below said first container, first and second conduits connecting said first and second containers respectively with said chamber to feed said ingredient thereto, means for conveying said ingredient from said chamber to said dispensing station, said first container being located wholly above said second container so that the ingredient in said first conduit is pressurized to a greater extent than the ingredient in said second conduit, whereby said first container is emptied prior to said second container.

7. In a beverage dispensing machine wherein a receptacle at a dispensing station is automatically filled with beverage, apparatus for storing and supplying an ingredient of the beverage comprising, in combination, first and second containers each adapted to hold a quantity of said ingredient, a common supply chamber, means for conveying said ingredient from said chamber to said dispensing station in discrete quantities suitable for dispensing in any one receptacle, said supply chamber having a large capacity relative to the quantity of said ingredient dispensed in any one receptacle, first and second conduits connecting said first and second containers respectively with said supply chamber to feed said ingredient thereto, means for pressurizing the ingredient in said first conduit to a greater extent than the ingredient in said second conduit, whereby said first container is emptied prior to said second container, and a check valve in said second conduit for preventing the flow of said ingredient from said first container to said second container.

8. In a beverage dispensing machine wherein a receptacle at a dispensing station is automatically filled with beverage, apparatus for storing and supplying a liquid dairy product, such as cream, to be dispensed as an ingredient of the beverage comprising, in combination, a refrigerator box, first and second containers in said refrigerator box and each adapted to hold a quantity of said dairy product, a common supply chamber positioned adjacent the bottom of said refrigerator box, first and second conduits connecting said first and second containers respectively with said chamber to feed said dairy product thereto, hose means for conveying said dairy product up from said chamber and out of said refrigerator box near the top thereof, a pump for said hose means for drawing said dairy product up out of said common supply chamber, said first container being located wholly above said second container so that the dairy product in said first conduit is pressurized to a greater extent than the dairy product in said second conduit, whereby said first container is completely emptied into said supply chamber before any of the dairy product is drawn out of said second container, and a check valve in said hose means above said pump to prevent the flow of said dairy product down towards said common supply chamber.

9. In a coffee dispensing machine wherein a receptacle at a dispensing station is automatically filled with coffee, apparatus for storing and supplying cream to be dispensed with said coffee comprising, in combination, first and second containers each adapted to hold a quantity of said cream, a common supply chamber having a capacity that is large relative to the amount of cream to be dispensed with any one receptacle of coffee, first and second conduits connecting said first and second containers respectively with said chamber to feed said cream thereto, pump means for conveying said cream from said supply chamber to said dispensing station, dispensing cycle timer means for activating said pump means for a period of time that is short relative to the total time interval for dispensing a complete receptacle of coffee, means for pressurizing the cream in said first conduit to a greater extent than the cream in said second conduit, whereby said first container is emptied prior to said second container, and a check valve in said second conduit for preventing the flow of said cream from said first container to said second container.

10. In a beverage dispensing machine wherein a receptacle at a dispensing station is automatically filled with a beverage including an amount of cream as an ingredient thereof, apparatus for storing and supplying the cream comprising, in combination, first and second containers each adapted to hold a quantity of cream, a common supply chamber having a capacity that is large relative to the amount of cream that is dispensed into any one receptacle, first and second conduits connecting said containers respectively with said chamber to feed said cream thereto, a flexible hose for conveying cream from said chamber to be dispensed at said dispensing station, a rotatably driven shaft, an eccentric pressure member driven by said shaft, said flexible hose being formed into a loop extending around said pressure member, and a rigid ring mounted around said loop in a fixed position relative to the axis of said shaft, said ring being located sufficiently close to said eccentric pressure member that said hose is pinched therebetween, whereby the rotation of said pressure member forces the cream through said hose, said first container being located above said second container so that the cream in said first conduit is pressurized to a greater extent than the cream in said second conduit, with the result that said first container is emptied prior to said second container.

11. In a beverage dispensing machine, apparatus for supplying a liquid beverage ingredient such as cream and the like, comprising, in combination, a chamber adapted to hold a quantity of said ingredient, a flexible hose connected to said chamber to communicate with the ingredient therein, a tubular frame member open at one end, a shaft rotatably and coaxially mounted within said tubular frame member with a portion of said shaft protruding out through said open end, an eccentric pressure member mounted on said shaft for rotation therewith beyond the open end of said tubular frame member, said flexible hose being formed into a loop extending around said pressure member with said loop approximately coaxial with said shaft, and a rigid cap telescoped over said tubular frame member at the open end thereof, the inner surface of said cap being located sufficiently close to said pressure member that said hose is pinched therebetween whereby the rotation of said pressure member forces said ingredient through said hose.

12. In a beverage dispensing machine, apparatus for supplying a liquid beverage ingredient such as cream and the like, comprising, in combination, a chamber adapted to hold a quantity of said ingredient, a flexible hose connected to said chamber to draw the ingredient therefrom, a rotatably driven shaft, an arm fastened to said shaft and extending out a short distance away from one side thereof, a cylindrical roller member secured to said arm with its axis parallel to the axis of said shaft, a rigid cup-shaped member loosely mounted on said shaft with the inner surface of its side wall in contact with said roller member, said flexible hose being formed into a loop extending around and in contact with the side wall of said cup-shaped member, and a rigid support ring fixedly mounted in position around said hose loop, said ring being located sufficiently close to said cup-shaped member that said hose is pinched therebetween in the region immediately adjacent said roller member, whereby the rotation of said roller member forces said ingredient through said hose.

13. In a beverage dispensing machine, apparatus for supplying a liquid beverage ingredient such as cream and the like, comprising, in combination, a refrigerator box, a chamber in said box and adapted to hold a quantity of said ingredient, a flexible hose connected to said chamber to communicate with the ingredient therein, a tubular frame member secured to one wall of said refrigerator box, said tubular frame member being open at one end, a shaft rotatably and coaxially mounted within said tubular frame member with a portion of said shaft protruding out through the open end thereof, a roller member eccentrically mounted on said shaft for rotation therewith beyond the open end of said tubular frame member, said flexible hose being formed into a loop extending around said roller member with said loop approximately coaxial with said shaft, and a rigid cap telescoped over said tubular frame member at the open end thereof, the inner surface of said cap being located sufficently close to said roller member that said hose is pinched therebetween whereby the rotation of said roller member around said shaft forces said ingredient through said hose.

14. In a beverage dispensing machine, apparatus for supplying a liquid beverage ingredient such as cream and the like, comprising, in combination, a chamber adapted to hold a quantity of said ingredient, a flexible hose connected to said chamber to draw the ingredient therefrom, a rotatably driven shaft, an arm fastened to said shaft and extending out a short distance away from one side thereof, a cylindrical roller member secured to said arm with its axis parallel to the axis of said shaft, a rigid cup-shaped member loosely mounted on said shaft with the inner surface of its side wall in contact with said roller member, said flexible hose being formed into a loop extending around and in contact with the side wall of said cup-shaped member, and a rigid cap fixedly mounted in position around said hose loop with its side wall in contact with said hose, said side wall being formed with spline-like serrations to lightly grip said hose, said cap side wall being located sufficiently close to said cup-shaped member that said hose is pinched therebetween in the region immediately adjacent said roller member, whereby the rotation of said roller member forces said ingredient through said hose.

15. In a beverage dispensing machine, apparatus for supplying a liquid beverage ingredient such as cream and the like, comprising, in combination, a chamber adapted to hold a quantity of said ingredient, a flexible hose connected to said chamber to communicate with the ingredient therein, a tubular frame member open at one end, a shaft rotatably and coaxially mounted within said frame with a portion of said shaft protruding out through said open end, roller bearing means for supporting said shaft portion for free rotation, an eccentric pressure member mounted on said shaft for rotation therewith beyond the open end of said frame, said flexible hose being formed into a loop extending around said pressure member with said loop approximately coaxial with said shaft, and a rigid cap telescoped over said frame at the open end thereof and arranged to hold said roller bearing means in position, the inner surface of said cap being located sufficiently close to said pressure member that said hose is pinched therebetween whereby the rotation of said pressure member forces said ingredient through said hose.

16. In a hot beverage dispensing machine wherein a receptacle at a dispensing station is automatically filled with hot beverage, means for storing and supplying said hot beverage comprising, in combination, a dispensing machine cabinet having an opening for access to the interior thereof, pedestal means permanently secured to said cabinet in the interior thereof, a hot beverage storage tank removably mounted on said pedestal means, an electrical heating unit in said pedestal means for heating the beverage in said storage tank, a support wall for said storage tank and abutting the side thereof that is remote from said cabinet opening, said support wall being formed to match the contour of said storage tank side to assure accurate positioning of said tank when it is placed on said pedestal means, and a temperature-sensitive thermostatic element for controlling said electrical heating unit and secured in a fixed position relative to said support wall adjacent but spaced from said storage tank side, said thermostatic element being arranged to respond to changes in the temperature of said storage tank to maintain the temperature of the hot beverage in said storage tank constant, and means for conveying hot beverage from said storage tank to said dispensing station.

17. In a hot beverage dispensing machine wherein a receptacle at a dispensing station is automatically filled with hot beverage, means for storing and supplying said hot beverage comprising, in combination, a dispensing machine cabinet having an opening in the front thereof for access to the interior of said cabinet, pedestal means fixedly secured to said cabinet within the interior thereof and accessible through said opening, a cylindrical hot beverage storage tank removably mounted on said pedestal means in an upright position, an electrical heating unit in said pedestal means for heating the beverage in said storage tank, a generally semi-cylindrical support wall for said storage tank. said support wall closely abutting the side of said storage tank that is remote from said cabinet opening, said support wall further being formed to match the contour of said storage tank and to extend along a substantial area thereof to assure accurate positioning of said storage tank when it is placed on said pedestal means, a temperature-sensitive thermostatic element for controlling said electrical heating unit, means for securing said thermostatic element to said support wall in a position approximately equidistant from the side edges thereof and adjacent but spaced from said storage tank, said support wall being formed with an aperture opposite said thermostatic element whereby said element responds to changes in the temperature of said storage tank to maintain the temperature of the hot beverage in said storage tank constant, and means for conveying hot beverage from said storage tank to said dispensing station.

References Cited in the file of this patent

UNITED STATES PATENTS

| | | |
|---|---|---|
| 479,637 | Everett | July 26, 1892 |
| 1,989,395 | Betz et al. | Jan. 29, 1935 |
| 2,572,541 | Thompson et al. | Oct. 23, 1951 |
| 2,621,838 | Price | Dec. 16, 1952 |
| 2,718,843 | Jones | Sept. 27, 1955 |
| 2,730,034 | Svendsgaard | Jan. 10, 1956 |
| 2,832,510 | Hill | Apr. 29, 1958 |
| 2,872,075 | Steiner | Feb. 3, 1959 |